Fig. 2

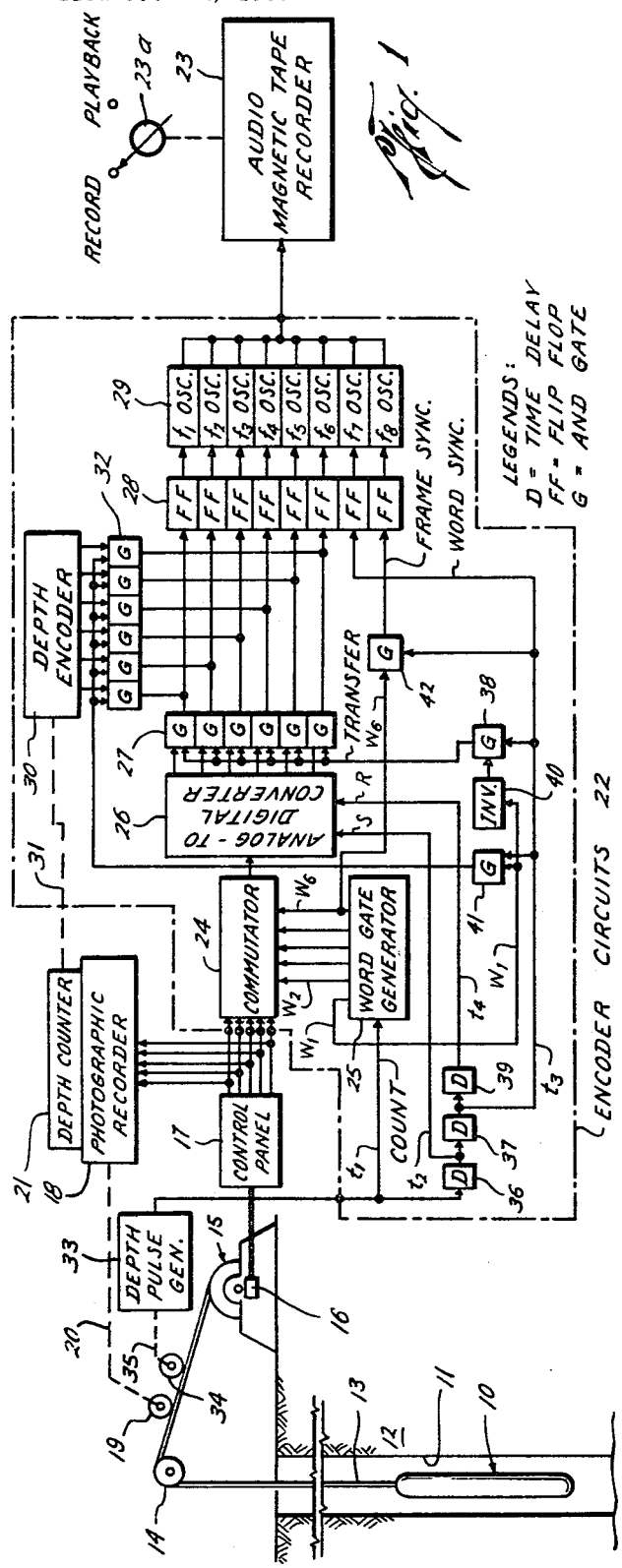
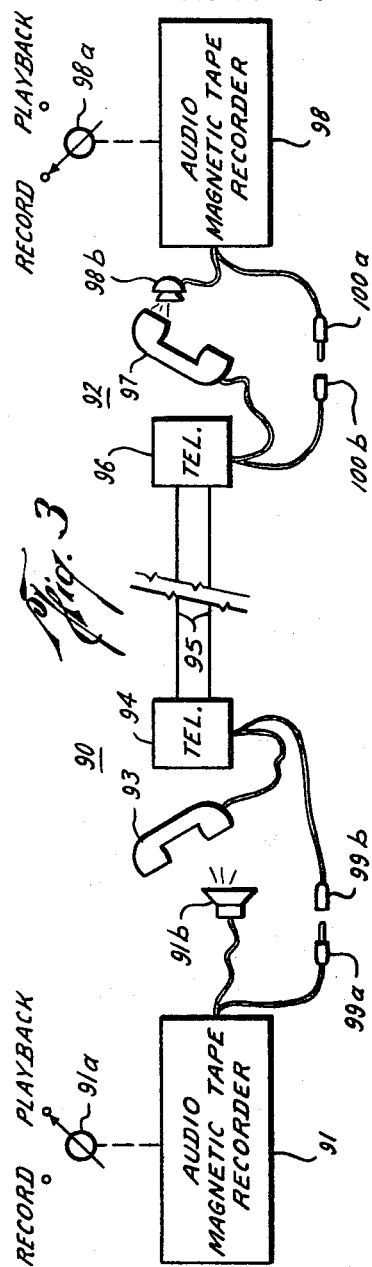
Fig. 1
Fig. 3
William J. Sloughter
INVENTOR.
BY Richard E. Bee
ATTORNEY

William J. Sloughter
INVENTOR.

BY Richard E. Bee

ATTORNEY

United States Patent Office 3,388,375
Patented June 11, 1968

3,388,375
MAGNETIC TAPE RECORDING METHODS AND APPARATUS FOR WELL LOGGING
William J. Sloughter, Houston, Tex., assignor, by mesne assignments, to Schlumberger Technology Corporation, Houston, Tex., a corporation of Texas
Filed Oct. 26, 1965, Ser. No. 505,283
11 Claims. (Cl. 340—18)

ABSTRACT OF THE DISCLOSURE

This disclosure pertains to methods and apparatus for converting data signals to coded audio signals representative thereof and recording the audio signals on magnetic tape. Thereafter, the audio signals are reproduced and transmitted by suitable means, as a telephone line, to a distant point where the coded audio signals are decoded to reproduce the original data. More particularly, a plurality of well logging signals are digitized on a time sharing basis and audio signals having different frequencies are generated in accordance with the presence or absence of bits in the various bit positions of the digital signals. The digitizing operation is controlled by the movement of the well logging instrument through the borehole and suitable bit positions having audio signals of given frequencies are utilized for synchronization signals. When the magnetic tape is played back for transmission of the audio signals to the distant point, the synchronization data is utilized to control the recorder movement at the distant point.

---

This application includes subject matter disclosed in applicant's copending application Ser. No. 489,643, filed on Sept. 23, 1965 and entitled,"Well Logging Telemetry System."

This invention relates to methods and apparatus for recording data signals on magnetic tape, which methods and apparatus are particularly useful for recording data signals obtained from well logging measurements made in boreholes drilled into the earth.

In the well logging art, a logging sonde containing one or more exploring devices is lowered into a borehole drilled into the earth for measuring various properties of the subsurface earth formations adjacent the borehole. Such measurements are of considerable value in determining the presence and depth of hydrocarbon-bearing zones (oil, gas, etc.) that may exist in the subsurface earth formations. The measurement signals from the downhole sonde have heretofore been recorded by a multi-channel recorder located at the surface of the earth. In the past, such multi-channel recorders have been of either the photographic film type, where the signals are recorded as light-beam traces on a long strip of photographic film material, or of the mechanical strip chart type, where the signals are recorded as ink traces on a long strip of chart paper. In either case, the recording film or chart is advanced past the recording elements in synchronism with the movement of the logging sonde through the borehole. The resulting record, known as a "log," may then be examined by various geologist and geophysical experts to determine the nature of the subsurface earth formations and whether or not any oil or gas may be present and, if so, in what quantity and so forth.

Since the borehole may extend as far as 20,000 to 25,000 feet into the earth and since a number of different measurements may be made in the same borehole, a considerable volume of data is acquired. While the photographic film and strip chart records heretofore obtained are useful for many purposes, they are not very well suited for use with automatic data processing and automatic computing apparatus. This is because such automatic data processing apparatus usually requires electrical input signals and it is difficult to obtain such electrical signals from a film or paper record.

One way of solving the problem is to also record the well measurement signals on magnetic tape. This has been heretofore proposed. The methods and apparatus heretofore proposed, however, have been more expensive and more complex than is sometime desired.

Another problem that frequently occurs in the well logging art is that of making the recorded logs which are obtained at the well site location quickly and rapidly available to various technical and management personnel located miles away in some central office location. This problem might be solved by using radio transmission equipment for transmitting the data by means of radio waves. Sometimes, however, such radio equipment is not readily available. At other times, radio transmission is not desirable because the radio waves might be easily intercepted by undesired third parties who are desirous of obtaining what, in many cases, is very valuable geological data. As will be seen hereinafter, solutions to these problems can be obtained by recording the well logging data signals on magnetic tape.

It is an object of the invention, therefore, to provide new and improved methods and apparatus for recording data signals on magnetic tape.

It is another object of the invention to provide a new and improved magnetic tape recording system for recording several different data signals on magnetic tape in a relatively simple and relatively inexpensive manner.

It is a further object of the invention to provide a new and improved method for rapidly and quickly transporting well logging data from a remote well site location to a more convenient central office location with a minimum of expense and with a minimum likelihood that the data may be intercepted by an undesired party.

In accordance with one feature of the invention, a method of recording well lagging signals on magnetic tape comprises moving an exploring instrument through a borehole drilled into the earth and measuring a subsurface phenomenon and producing an electrical signal indicative of such measurements and converting the signal into a plural-bit pulse code signal. The method also includes converting the individual bits of the pulse code signal into different audio frequency tones which represents by its frequency pattern the coding of said pulse code signal. Furthermore, these converting and producing steps may be performed in step with the movement of the exploring instrument through the borehole. The method further includes combining the audio frequency tones and recording the combined audio frequency tones on a magnetic tape which is moving in a continuous manner and at a constant speed. As a consequence, the recording may be performed by means of readily available and relatively inexpensive audio magnetic tape recording apparatus.

In accordance with another feature of the invention, well logging data is rapidly transmitted from a remote well site location to a central office location by recording the data in the form of audio frequency tones on a magnetic recording tape. The tape, together with a tape playback unit, is then carried to the nearest available telephone. Telephone connections are established with the central location. The recorded tape is then played back by means of the playback unit and the audio frequency tones transferred to the telephone lines, whereupon they are transmitted to the central office location in the same manner as for an ordinary telephone conversation.

The audio tones received at the central office location may then be used to drive a photographic recorder to produce a record or log of the well logging data which is identical to that obtained at the well site. The transmitted information includes information to enable the central office recorder to move as a function of well depth.

For a better understanding of the present invention, together with other and further objects and features thereof, reference is had to the following description taken in connection with the accompanying drawings, the scope of the invention being pointed out in the appended claims.

Referring to the drawings:

FIG. 1 is a schematic block diagram of a representative embodiment of apparatus constructed in accordance with the present invention for recording data signals on magnetic tape;

FIG. 2 is a schematic block diagram of a representative embodiment of apparatus constructed in accordance with the present invention for reproducing data signals recorded on magnetic tape; and FIG. 3 illustrates a method of practicing the invention for purposes of transmitting data signals from one location to another.

Referring to FIGURE 1 of the drawings, there is shown an exploring instrument or well logging sonde 10 adapted for movement through a borehole 11 drilled into the earth 12. The sonde 10 is suspended in the borehole 11 by means of an armored multi-conductor cable 13 which passes over a sheave wheel 14 to a drum and winch mechanism 15 located at the surface of the earth. The sonde 10 includes various exploring and measuring devices for measuring various borehole parameters such as various electrical, acoustical and radioactive properties of the sub-surface earth formations.

The measurement signals sent to the surface of the earth by way of the individual conductors in the cable 13 are supplied by way of a brush and slip-ring mechanism 16 to a control panel 17. These signals are direct-current type analog data signals, each representing a different downhole measurement and each appearing on a different one of the output lines from the control panel 17. In the present example, it is assumed that five different measurements are involved, hence, five such output lines are shown.

These analog data signals are supplied to a multi-channel photographic recorder 18 located at the well site. The recording medium or photographic film in the recorder 18 is advanced past the recording elements in synchronism with the movement of the sonde 10 through the borehole 11. This is done by means of a mechanical measuring wheel 19 and an associated mechanical linkage 20, the wheel 19 engaging and being rotated by the cable 13 at a location near the drum and winch mechanism 15. The recorder 18 also includes a mechanical odometer-type depth counter 21 which is connected internally to the mechanical linkage 20 to provide a visual indication of the depth of the sonde 10 in the borehole 11.

The usual manner of exploring the borehole 11 is to lower the sonde 10 to the bottom of the hole and then perform the measurements as the sonde 10 is withdrawn from the hole at a fairly constant speed.

The five analog data signals appearing at the output of control panel 17 are also supplied to encoder circuits 22 which operate to convert these signals into a form which may be recorded by an audio magnetic tape recorder 23. In the encoder 22, these parallel analog signals are supplied to a commutator 24 which converts them into serial-type data samples which appear one at a time in sequence on a single output line from commutator 24. Commutator 24 includes five relay-type switches which may be individually opened and closed to connect the input data signals one at a time in sequence to the single output line. These switches within commutator 24 are controlled by gating signals generated by a word gate generator 25 so that only one switch at a time is closed.

The serial train of analog data pulses or data samples from commutator 24 are supplied to an analog-to-digital converter 26. Converter 26 converts each of these analog data pulses, during its turn of occurrence, into a plural-bit parallel-type pulse code signal. In the illustrated embodiment, six bits are used by way of example and the individual bits appear on six individual output lines from the converter 26. (More bits may be used where greater resolution is desired.)

Shortly after each analog-to-digital conversion is completed, the set of bit signals representing the analog data value is transferred in a parallel manner by way of a set of six individual AND gate circuits 27 to the first six of a set of eight flip-flop circuits 28. Flip-flop circuits 28 operate as a storage register to store a given set of data bits in a parallel manner until the occurrence of the set of bits for the next data measurement.

Flip-flop circuits 28 control a set of eight audio frequency tone oscillators 29, each of the flip-flops 28 controlling a different one of the oscillators 29. If a particular flip-flop 28 is producing an output signal level corresponding to a binary "one" value, then the corresponding oscillator 29 will be turned on and allowed to oscillate. If, one the other hand, the flip-flop 28 is producing an output signal level corresponding to a binary "zero" value, then the corresponding oscillator 29 will be disabled and will not oscillate.

As an example, the tone oscillators 29 may be constructed so that the $f_1$ oscillator oscillates at a frequency of 1100 cycles per second, the $f_2$ oscillator at a frequency of 1200 cycles per second, the $f_3$ oscillator at a frequency of 1300 cycles per second and so forth, with the oscillation frequencies being spaced 100 cycles apart, in which case the last or $f_8$ oscillator would be constructed to oscillate at a frequency of 1800 cycles per second.

The output from the various ones of the tone oscillators 29 are tied together and connected to a common input terminal of the recording circuit contained in the audio magnetic tape recorder 23. Recorder 23 is provided with a control knob 23a for setting the recorder 23 to either a recording mode or a playback mode. In the present case, the control knob 23a is set to the recording mode. In this mode, the combined audio frequency tones supplied to the recording circuit or recorder 23 are recorded on the magnetic tape contained within the recorder 23. This is done by the single magnetic recording head of the recorder 23 so that the combined tones are recorded in a single track on the magnetic tape. The pattern formed by the presence or absence of the different audio tones at any particular point on the magnetic tape forms a code pattern representing the numerical value of one of the data signals at a particular instant of time. This might be termed a "plural-tone" pulse code signal.

The tape recorder 23 is constructed so that the magnetic tape is advanced in a continuous manner at a constant speed as the logging sonde 10 is moved through the borehole. This speed is independent of the speed of the logging sonde 10.

It is evident from the foregoing that the tape recorder 23 may take the form of any conventional, commercially available audio tape recorder presently used for recording musical programs and the like.

The encoder circuits 22 also include means for inserting a somewhat different type of measurement signal into the set of measurement signals which are recorded on the magnetic tape. In particular, the encoder circuits 22 also include a depth encoder 30 which is connected by way of a mechanical linkage 31 to the depth counter 21 associated with the photographic recorder 18. Depth encoder 30 converts the settings in the depth counter 21 into a plural-bit parallel-type set of electrical signals which are coded to represent the depth values shown on depth counter 21. At the proper moment, the signals on the parallel output lines from the depth encoder 30 are transferred by way of a set of AND gate circuits 32 to the flip-flop circuits comprising the register 28.

In order to provide the timing for the encoder circuits 22, the apparatus of FIG. 1 includes a depth pulse generator 33 which is mechanically driven by a second measuring wheel 34 and associated mechanical linkage 35, the wheel 34 engaging end being rotated by the logging cable 13. Depth pulse generator 33 produces an output pulse each time the logging sonde 10 moves a vertical distance of one inch in the borehole 11. These depth pulses are supplied to the timing circuit portion of the encoder circuits 22.

These timing circuits include the word gate generator 25. Word gate generator 25 includes a 6:1 pulse counter together with a matrix circuit for producing on different output lines, designated $W_1$ through $W_6$, individual gating signals corresponding to the different count combinations in the 6:1 counter. The ratio of 6:1 is for the assumed case where six different measurements are to be recorded on the magnetic tape.

Each internal during which one of the measurement signals is sampled, converted and recorded is called a "word" interval. Thus, during the Word One ($W_1$) interval, a code word representing the numerical value of a first of the measurement signals is recorded on the magnetic tape. Similarly, during the Word Two ($W_2$) interval, a second code word representing the value of a second of the measurement signals is recorded on the magnetic tape. In the present example, where six measurements are involved, the recording of six successive words ($W_1$ through $W_6$) constitutes one "frame" of data. After one frame of data is recorded, the process is repeated, each of the measurement signals again being sampled in sequence to record a second frame of data on the magnetic tape. This process continues to be repeated until the well logging measurements are completed, or, in other words, successive frames of data continue to be recorded until the well logging measurements are completed. For one-inch depth pulses, one frame of six words is produced as the sonde 10 moves a distance of six inches through the borehole.

Each depth pulse from the depth pulse generator 33 is supplied to the counting input of the word gate generator 25 to set the word gate generator 25 to provide a gating signal for the measurement signal which is to be recorded. This closes the corresponding switch in the commutator 24 so as to connect this measurement signal to the input of the analog-to-digital converter 26. The time of occurrence of this depth pulse may be designated as time $t_1$.

This same depth pulse at $t_1$ is supplied to a delay circuit 36 to produce shortly thereafter at a time $t_2$ a pulse which is supplied to the "start" terminal (S) of the analog-to-digital converter 26 to start the converting operation therein. The $t_2$ pulse from delay circuit 36 is also supplied to a second delay circuit 37 to produce shortly thereafter a further pulse at the time $t_3$. The time interval $t_2-t_3$ is sufficient to allow completion of the analog-to-digital conversion process in the converter 26. This $t_3$ pulse is then passed by way of a gate circuit 33 to each gate of the set of transfer gates 27. This $t_3$ pulse thereupon operates as a transfer pulse to transfer any binary "one" values appearing on the output lines of converter 26 to the corresponding flip-flops in the register 28. More precisely, the $t_3$ pulse is passed by any of the gates 27 which are at that moment also being energized by a "one" level output from converter 26.

The $t_3$ pulse is also supplied to a third delay circuit 39 to produce shortly thereafter a further pulse at time $t_4$. This $t_4$ pulse is supplied to the "reset" terminal (R) of the analog-to-digital converter 26 to reset the converter 26 so that it will be ready to convert the next measurement signal supplied to the input thereof.

Things remain in this condition, with the data value just converted being stored in the register 28, until the occurrence of the next depth pulse from the depth pulse generator 33. Upon such occurrence, this same sequence of events is then repeated, except that it is done for the next measurement signal.

In order to insert the borehole depth value from the depth encoder 30 into the train of code words which are being recorded, it is necessary to reserve one of the word intervals for this purpose. In the present example, the Word One ($W_1$) interval is chosen for this purpose. Whenever it is not a Word One interval, the gating circuit 38 is maintained in an operative condition. This is done by connecting the $W_1$ word line from the word gate generator 25 to an inverter circuit 40 which, in turn, is connected to the second input of the gate circuit 38. Consequently, whenever the signal level on the $W_1$ line is at the "zero" value, inverter circuit 40 operates to produce a "one" level output signal which energizes the second input of the gate circuit 38. Conversely, during the Word One interval when the $W_1$ line is at the "one" level, inverter circuit 40 produces a "zero" level output signal, thus disabling the gate circuit 38 during this $W_1$ word interval.

The $W_1$ line is also connected to one input of an AND gate circuit 41. This gate circuit 41 is thus operative during the $W_1$ word intervals. As a consequence, during the $W_1$ word intervals, the $t_3$ pulse from delay circuit 37 is supplied by way of the gate circuit 41 to the transfer gates 32 associated with the depth encoder 30. This causes the coded depth values to be transferred to the flip-flops 28 and, thus, to control the first six tone oscillators 29 during the $W_1$ word intervals.

In order to provide synchronizing pulses to indicate the locations of the various words of data recorded on the magnetic tape, the $t_3$ pulse for each word interval is also supplied to a seventh of the flip-flop circuits 28. The flip-flop circuit controls the seventh or $f_7$ one of the tone oscillators 29.

In order to identify the end of each frame of data on the magnetic tape, a frame sync signal is developed during each $W_6$ word interval. This is done by supplying the $t_3$ pulse by way of an AND gate circuit 42 to an eighth of the flip-flop circuits 28. This eighth flip-flop circuit controls the $f_8$ tone oscillator. Gate circuit 42 is activated only during the $W_6$ word interval by connecting the second input terminal of gate 42 to the $W_6$ output line of the word gate generator 25.

As is seen from the foregoing, eight audio tones are recorded on the magnetic tape contained within the recorded 23, six being used to form the code words for the numerical data values and two being used for synchronization purposes.

There are two primary ways in which the tones may be recorded on the magnetic tape. One might be termed a "return-to-zero" method and the other a "non-return-to-zero" method. The "zero" in this case refers to the binary logic value as opposed to the actual signal amplitude. The "non-return-to-zero" method is illustrated in the drawings. In this case, each time a set of data bits are transferred to the flip-flops 28, only those flip-flops which receive a "one-bit" input pulse are changed. Thereafter, the flip-flops 28 remain in this condition until the next transfer time ($t_3$) whereupon only those flip-flops 28 which receive "one-bit" input pulses are again changed. In this method of operation, it is the "changes" which represent the binary "one" values, the absence of a change representing a binary "zero" value. The tone oscillators 29 are driven accordingly. Thus, for example, a change in the frequency of the $f_1$ oscillator (from "ON" to "OFF" or vice versa) denotes a binary "one" value.

The other method of recording, which may be easily accomplished with the FIG. 1 apparatus, is the "return-to-zero" method. This is accomplished by resetting the flip-flop circuits 28 to a zero condition at the occurrence of each depth pulse from the depth pulse generator 33 (at $t_1$). This is done by connecting the output line from the depth pulse generator 33 to appropriate reset terminals for the flip-flops 28. In this case, the data bit pulses transferred to the flip-flops 28 at the $t_3$ transfer time will set to a "one" state only those flip-flops which receive a "one-bit" input pulse. In this manner of operation, the tone oscillators 29 are turned "ON" only when they are intended to represent a binary "one" value.

Referring now to FIGURE 2 of the drawings, there are shown decoder circuits 50 for use with the audio magnetic tape recorder 23 for reconstructing the original measurement signals from the coded signals recorded on the magnetic tape. As indicated by the control knob 23a, the recorder 23 is at this time set to the playback mode. The reconstructed analog measurement signals provided by decoder circuits 50 may be used to drive a photographic recorder 51 to produce a replica of the original chart-type log produced by the photographic recorder 18 of FIG. 1 during the well logging operation. Also, or in the alternative, as may be desired, the coded signals recovered from the magnetic tape may be supplied to a digital computer 52 for computing purposes or to a digital magnetic tape recorder 53 for producing a digital tape which may subsequently be used with a digital computer for performing digital computations.

The decoder circuits 50 include a set of eight tone filters 60 for separating the different audio frequency tones. Each of these filters is a band-pass filter for passing only its own particular audio frequency. In the present example, the $f_1$ filter passes only the 1100 cycle per second tone, the $f_2$ filter the 1200 cycle per second tone, and so forth. The separated audio tones are supplied to a corresponding set of eight individual detector circuits 61 for individually detecting the modulation envelopes thereof. The detected signals are then supplied in parallel to corresponding ones of a set of eight pulse generators 62. Each of the pulse generators 62 may be a monostable multivibrator which is adapted to produce a relatively narrow output pulse each time a particular type of signal impulse is supplied to the input thereof. In the case where the "non-return-to-zero" method is used in the recording process, the pulse generators 62 would be adapted to respond to either positive-going or negative-going changes in the detected signal to produce an output pulse upon either occurrence. In the case of the "return-to-zero" method, the pulse generators 62 would be adapted to respond to signal transitions in only one direction, namely, the direction corresponding to the leading edges of the "one-bit" pulses.

The numerical data bit pulses from the first six of the pulse generators 62 are supplied in parallel to a six-stage storage register 63. Register 63 had been previously reset to a zero condition shortly following the last group of data bits. The new data bits are stored in the register 63 until thereafter transferred to a desired one of six output registers 64 through 69. Each of output registers 64–69 is a six-stage storage register. As indicated by the double line conductor legend, the six output lines from storage register 63 are connected in a parallel manner to the six input terminals of each of the output registers 64–69. The proper one of output registers 64–69 is selected by means of a word gate generator 70 and a set of AND gates circuits 71 through 76.

Word gate generator 70 comprises a 6:1 pulse counter and a matrix circuit for producing on different output lines therefrom individual gating signals corresponding to the different count combinations in the 6:1 counter. These gating signals serve to activate the gating circuits 71–76. In this manner, only one at a time of the gating circuits 71–76 is activated.

Word gate generator 70 is advanced in step with the word intervals in the incoming playback signals by taking the word synchronizing pulses appearing at the output of the seventh of the pulse generators 62 at times designated $t_1$ and supplying these word sync pulses to a first delay circuit 77 to produce delayed pulses at times $t_2$ and then applying these $t_2$ pulses to a second delay circuit 78 which produces further delayed pulses at $t_3$ moments of time.

These $t_3$ pulses are supplied to the counting input of the 6:1 counter in the word gate generator 70.

Word gate generator 70 is synchronized with the successive frames in the reproduced signal by taking the frame sync pulses appearing at the output of the eighth of the pulse generators 62 and supplying these frame sync pulses to the reset terminal of the 6:1 counter in the word gate generator 70. The occurrence of a frame sync pulse thus serves to reset, if necessary, the 6:1 counter to a Word Six condition.

The timing is such that the data bits for a particular word of data appear at the outputs of the pulse generators 62 and are supplied to the storage register 63 at time $t_1$. Shortly thereafter a $t_2$ pulse is produced and passed by the appropriate one of the gate circuits 71–76 to the corresponding one of the output storage registers 64–69. This $t_2$ pulse serves to transfer the data from the storage register 63 to the selected one of the output registers 64–69. More particularly, it serves to set the individual stages of the selected output register to the same binary values as at that moment appear on the output lines of the storage register 63. Shortly thereafter, the $t_3$ pulse appears at the output of the delay circuit 78. This $t_3$ pulse advances the word gate generator 70 to the count condition for the next data word to be reproduced. The $t_3$ pulse also resets the storage register 63 to a "zero" condition. This sequence of operations is repeated as each data word recorded on the magnetic tape is reproduced.

The output lines from the first output storage register 64 are coupled to a depth display unit 79. Depth display 79 is comprised of banks of indicator lamps which may be energized to indicate numerical values. As such, they provide a visual indication of the borehole depth for the data values being reproduced. The remainder of the output registers, namely, registers 65–69, are individually connected to corresponding ones of a set of five individual binary-to-analog converters 80. These binary-to-analog converters 80 convert the binary values stored in the corresponding one of the output registers 65–69 into direct-current type analog signals. Each of these analog signals corresponds to one of the original measurements signals obtained during the borehole measurements. These analog signals are supplied to the photographic recorder 51 which serves to record them as individual tracers on the recording film thereof.

In order for the photographic recorder 51 to produce the desired traces, it is necessary to advance the recording film therein in a manner which follows the original movements of the logging sonde 10 through the borehole. This is done by taking the word synchronizing pulses appearing at the output of the seventh of the pulse generators 62 and supplying them to motor drive circuits 81. Circuits 81, in turn, drive an electric motor 82 which is mechanically coupled by way of linkage 83 to the mechanical mechanism for advancing the recording film in the recorder 51. Motor drive circuits 81 are constructed to energize the motor 82 for a brief instance each time one of the word synchronizing pulses is supplied to the input of such motor drive circuits 81. As a consequence, the motor 82 advances the recording film in discrete increments or steps. In general, these word synchronizing pulses occur fairly rapidly so that the movement of the recording film will appear to be almost continuous in nature. Since these word synchronizing pulses correspond to the original depth pulses produced during the making of the borehole measurements, a word synchronizing pulse represents one inch of vertical distance in the borehole. As a consequence, the recording film in recorder 51 is advanced in a manner which duplicates the original movement of the logging sonde 10 through the borehole.

The photographic recorder 51 also includes an odometer-type depth counter 84 which is geared to the film advancing mechanism and which provides a visual indication of the borehole depth for the signals being recorded on the recording film. This depth counter 84 is compared with the depth indicated by the depth display 79 and if they are not in agreement, then the depth counter 84 is mechanically readjusted to provide such agreement.

In the drawings, the encoder circuits 22 are shown in FIG. 1 and the decoder circuits 50 are shown in FIG. 2, while the audio magnetic tape recorder 23 is shown in both figures. It should be understood, however, that all three of these units, namely, the encoder circuits 22, the recorder 23 and the decoder circuits 50, will frequently be packaged together to provide a single compact piece of equipment capable of both recording and reproducing well logging signals on magnetic tape. Thus, the three units together comprise a highly useful recording apparatus for use with well logging signals.

Referring now to FIGURE 3 of the drawings, there will be described in connection therewith a method of utilizing the tape recorder apparatus of the present invention for enabling simple and inexpensive transmission of well logging data by means of telephone lines. As a first step in the method, the well logging measurement signals are recorded as audio tones on a magnetic recording tape by the use of the apparatus as shown in FIG. 1. The audio tape recorder unit is then disconnected from the remainder of the apparatus and transported to the nearest telephone location, represented at 90 in FIG. 3. This disconnected and transported tape recorder unit is represented by the recorder 91 in FIG. 3. The distant central office to which it is desired to transmit the logging signals, represented at 92 in FIG. 3, is then dialed up in the usual manner. Recorder 91 is then operated to play back the recorded audio tone signals, the audio tones being audibly reproduced by means of a loudspeaker 91b built into or associated with the recorder 91. The loudspeaker 91b is held close to the appropriate end of the telephone handset 93 connected to the telephone instrument 94 at location 90. As a consequence, the audio tones representing the logging signals are transmitted by way of the existing telephone lines 95 in the same manner as for an ordinary telephone conversation.

These audio tones are received at a telephone instrument 96 located at the distant central office location 92. As a consequence, these audio tones are audibly reproduced at the appropriate end of the telephone handpiece 97 connected to the telephone instrument 96. These audible tones may then be recorded on a second audio magnetic tape recorded 98 located at the central office 92 by means of a microphone pick-up unit 98b attached to the second recorder 98 and placed near the appropriate end of the telephone handpiece 97.

The audio tones recorded by the second magnetic tape recorder 98 may then be played back into a set of decoder circuits located at the central office and constructed in the manner indicated in FIG. 2. The resulting reconstructed analog signals may be used to drive a photographic recorder located at the central office to produce thereat a replica of the well log produced at the well site location. If desired, the tape recorder at the central office might be dispensed with and the received audio tones applied directly to the decoder circuits by means of a suitable microphone pick-up unit and audio amplifier, the output of the latter being connected to the input of the decoder circuits.

Instead of using a loudspeaker 91b, the recorder 91 may be connected to the telephone instrument 94 by inserting a plug 99a into a jack 99b, plug 99a being connected in parallel with loudspeaker 91b and jack 99b being connected in parallel with the microphone in the telephone handpiece 93. Similarly, at the central office location 92, the recorder 98 may be connected to the telephone instrument 96 by inserting a plug 100a into a jack 100b, plug 100a being connected in parallel with microphone 98b and jack 100b being connected in parallel with the receiver unit in the telephone handpiece 97. Plugs 99b and 100b would be provided by the company owning the telephone instruments and telephone lines.

By using existing telephone lines and existing telephone equipment as depicted in FIG. 3, the logging data may be rapidly transmitted to a distant office location and the desired well log reproduced thereat. The resulting well log may then be studied by various technical and management personnel and appropriate instructions and decisions communicated back to the well site personnel in a minimum of time. The use of telephone lines also serves to preserve the secrecy of the well logging data since the signals are physically confined to the telephone lines and are, thus, not readily available to undesired parties.

In those cases where radio transmission is permissible or desirable, then the method of FIG. 3 may also be used in such cases. This may be done by replacing the telephone instrument 94 by a radio transmitter and the telephone instrument 96 by a radio receiver, the telephone lines 95 being replaced by the radio waves passing from the transmitter to the receiver. The radio equipment at both the well-site location and the central office location may also be of the two-way type for allowing communcations both ways.

From the foregoing description of the various embodiments of the invention, it is seen that there is provided a relatively simple and relatively inexpensive method of recording several different well logging measurement signals on magnetic tape. In particular, the present invention enables the use of readily available and relatively inexpensive audio magnetic tape recording equipment for producing the magnetic patterns on the tape. Where desired, such audio tape recorders may be of the compact, portable type.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of recording well logging signals on a magnetic tape comprising: moving an exploring instrument through a borehole drilled into the earth and measuring a subsurface phenomenon and producing an electrical signal indicative of such measurements; converting said signal into a plural-bit pulse code signal; producing for said plural-bit pulse code signal a group of audio frequency tone signals which represents by its frequency pattern the coding of said pulse code signal; performing these converting and producing steps in step with the movement of the exploring instrument through the borehole; combining the audio frequency tone signals; and recording the combined audio frequency tone signals on a magnetic tape which is moving past the recording head in a continuous manner and at a constant speed.

2. Apparatus for recording well logging signals on magnetic tape comprising:
   means for deriving signals representative of measured subsurface phenomena;
   means for deriving depth signals representative of the depth of the measured subsurface phenomena;
   means responsive to the depth signals for sampling the measured subsurface phenomena at selected depth intervals;
   means for converting each sampled measurement to plural-bit pulse code signals;
   means responsive to the plural-bit pulse code signals for generating a group of audio frequency signals which represent by its frequency pattern the coding of the pulse code signals;
   magnetic tape recorder means whose recording medium is adapted to be moved in a continuous manner and at a constant speed; and
   means for recording the combined audio frequency signals on the recording medium.

3. A method of recording several different well logging signals on magnetic tape comprising: moving an exploring instrument through a borehole drilled into the earth and measuring a plurality of subsurface phenomena and producing a plurality of electrical signals indicative of such measurements; sampling the different electrical signals one at a time in sequence; converting each signal sample into a plural-bit pulse code signal; producing for each plural-bit pulse code signal a group of audio frequency tone signals which represents by its frequency pattern the coding of the pulse code signals; performing these sampling, converting and producing steps in step with the movement of the exploring instrument through the borehole; combining the audio frequency tone signals; and recording the combined audio frequency tone signals on a magnetic tape which is moving past the recording head in a continuous manner and at a constant speed.

4. A method of recording several different well logging signals on magnetic tape comprising: moving an exploring instrument through a borehole drilled into the earth and measuring a plurality of subsurface phenomena and producing a plurality of electrical signals indicative of such measurements; sampling the different electrical signals one at a time in sequence; converting each signal sample into a plural-bit pulse code signal; producing for each plural-bit pulse code signal a group of audio frequency tone signals which represents by its frequency pattern the coding of the pulse code signals; performing these sampling, converting and producing steps in step with the movement of the exploring instrument through the borehole; producing depth signals indicative of increments of movement of the logging instrument through the borehole; converting these depth signals to additional audio frequency tone signals; combining the audio freqeuncy tone signals; and recording the combined audio frequency tone signals on a magnetic tape which is moving past the recording head in a continuous manner and at a constant speed.

5. A method of recording several different well logging signals on magnetic tape comprising: moving an exploring instrument through a borehole drilled into the earth and measuring a plurality of subsurface phenomena and producing a plurality of electrical signals indicative of such measurements; sampling the different electrical signals one at a time in sequence; converting each signal sample into a plural-bit pulse code signal; producing for each plural-bit pulse code signal a group of audio frequency tone signals which represents by its frequency pattern the coding of the pulse code signals; producing depth signals indicative of increments of movement of the logging instrument through the borehole; performing the sampling, converting and group producing steps in step with the depth signals; converting the depth signals to additional audio frequency tone signals; combining the audio frequency tone signals; and recording the combined audio frequency tone signals on a magnetic tape which is moving past the recording head in a continuous manner and at a constant speed.

6. A data recording well logging system for recording data signals on magnetic tape comprising: means for deriving well logging data signals as a function of well depth; means responsive to the derived well logging data signals for producing plural-bit pulse code signals at selected depth intervals; oscillator means responsive to the plural-bit pulse code signals for producing composite audio frequency tone signals having frequency components which represent the coding of the pulse code signals, such frequency components being members of a predetermined group of audio frequencies; tape recorder means for recording audio frequency signals on magnetic tape and for reproducing audio frequency signals recorded on magnetic tape; means for coupling the oscillator means to the tape recorder means for enabling the recording of the composite audio frequency tone signals on the magnetic tape; filter means responsive to composite audio frequency tone signals for separately reproducing the individual frequency components thereof which belong to the predetermined group; means for coupling the filter means to the tape recorder means for enabling reproduced audio signals to be supplied to such filter means; means responsive to the separately reproduced frequency components for producing plural-bit pulse code signals the coding of which correspond to the frequency patterns in the composite audio signals; and means for supplying these plural-bit pulse code signals to a utilization means.

7. A method of making well logging measurements in a borehole drilled into the earth at a well site location and rapidly and shortly thereafter producing a record of these measurements at a distant central office location comprising: converting the well logging measurements into audio frequency signals; producing signals indicative of the well depth to which the measurements correspond; generating audio signals representative of changes in said well depth; recording the audio signals on magnetic tape; establishing a communications link between first communications apparatus located at or near the well site and second communications apparatus located at or near the central office; reproducing the audio signals recorded on the magnetic tape; coupling the reproduced audio signals to the first communications apparatus for transmitting these audio signals to the second communications apparatus; and utilizing the audio signals received at the second communications apparatus; and utilizing the audio signals received at the second communications apparatus to produce a record of the well logging measurements.

8. A method of making well logging measurements in a borehole drilled into the earth at a well site location and rapidly and shortly thereafter producing a record of these measurements at a distant central office location comprising: making the well logging measurements at the well site; converting these measurements into audio frequency signals; producing signals indicative of the well depth to which the measurements correspond; generating audio signals representative of changes in said well depth; recording the audio signals on magnetic tape; establishing telephone connections between a first telephone station near the well site location and a second telephone station located at the central office location; reproducing the audio signals recorded on the magnetic tape; coupling the reproduced audio signals to the telephone apparatus at the first telephone station for transmitting these audio signals to the second telephone station; utilizing the audio signals representative of well depth to move a recording medium as a function of depth and utilizing the audio signals representative of the measurements received at the second telephone station to produce a record of the well logging measurements on the recording medium.

9. A method of making well logging measurements in a borehole drilled into the earth at a well site location and rapidly and shortly thereafter producing a record of these measurements at a distant central office location comprising: making the well logging measurements at the well site; producing signals indicative of the well depth to which the measurements correspond; generating coded audio signals representative of changes in said well depth in response to the signals indicative of well depth; converting these measurements into coded audio frequency tone signals; recording the coded audio signals on magnetic tape; transporting the magnetic tape to a first telephone station; establishing telephone connections between the first telephone station and a second telephone station located at the central office location; reproducing the audio signals recorded on the magnetic tape; coupling the reproduced audio signals to the telephone apparatus at the first telephone station for transmitting these audio signals to the second telephone station; utilizing the coded audio signals to move a recording medium in accordance with the depth changes and utilizing the audio signals representative of the measurements received at the second telephone station to produce a record of the well logging measurements of the recording medium.

10. A method of making well logging measurements in a borehole drilled into the earth at a well site location and thereafter producing a record of these measurements at a distant central office location comprising:
   moving an exploring instrument through a borehole drilled into the earth at a random rate and measuring a plurality of subsurface phenomena and producing signals indicative of the measurements;
   producing signals representative of the movement of the exploring instrument through the borehole;
   converting the measurement signals into audio signals representative thereof;
   converting the signals representative of movement into an audio signal at selected depth intervals;
   recording the audio signals on magnetic tape, which tape is moving at a constant speed;
   establishing a communication link between first communications apparatus located at or near the well site and second communications apparatus located at or near the central office;
   reproducing the audio signals recorded on the magnetic tape;
   coupling the reproduced audio signals to the first communications apparatus for transmitting these audio signals to the second communications apparatus; and
   utilizing the audio signals representative of the measurements received at the central office to produce a record of the well logging measurements on the recording medium.

11. A method of recording well logging signals on magnetic tape comprising: moving an exploring instrument through a borehole drilled into the earth and measuring subsurface phenomena and producing electrical signals indicative of the measurements; generating a signal representative of the movement of the exploring instrument through the borehole; sampling the measurements at selected depth intervals in response to the depth signal; converting each sampled measurement signal to a plural-bit pulse code signal; producing for each plural-bit pulse code signal a group of audio frequency tone signals which represents by its frequency pattern the coding of the pulse code signals; combining the audio frequency tone signals; and recording the combined audio frequency tone signals on a magnetic tape which is moving past the recording head in a continuous manner and at a substantially constant speed.

References Cited

UNITED STATES PATENTS

| | | |
|---|---|---|
| 2,275,609 | 3/1942 | Bryce. |
| 2,904,682 | 9/1959 | Rawlins. |
| 3,075,607 | 1/1963 | Aitken et al. _____ 181—.5 |
| 3,106,612 | 10/1963 | Lemelson _____ 179—100.2 X |
| 3,134,957 | 5/1964 | Foote et al. _____ 340—15.5 |
| 3,277,440 | 10/1966 | Gouilloud et al. __ 340—15.5 X |
| 3,286,033 | 11/1966 | Lemelson. |
| 3,329,931 | 7/1967 | Tanguy _____ 340—18 |

OTHER REFERENCES

Shultheis, Frenquency-Code Telemtering System, Electronics, April 1954, pp. 172–176.

RODNEY D. BENNETT, *Primary Examiner.*

BENJAMIN A. BORCHELT, *Examiner.*

R. M. SKOLNIK, D. C. KAUFMAN,
*Assistant Examiners.*